United States Patent
Huang et al.

(10) Patent No.: US 10,405,246 B2
(45) Date of Patent: Sep. 3, 2019

(54) METHOD AND APPARATUS FOR MANAGING MOBILITY OF MPTCP CONNECTION

(71) Applicant: Huawei Technologies Co., Ltd., Shenzhen (CN)

(72) Inventors: Min Huang, Shanghai (CN); Shu Zhang, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 297 days.

(21) Appl. No.: 15/332,820

(22) Filed: Oct. 24, 2016

(65) Prior Publication Data
US 2017/0041836 A1 Feb. 9, 2017

Related U.S. Application Data

(63) Continuation of application No. PCT/CN2014/076120, filed on Apr. 24, 2014.

(51) Int. Cl.
*H04W 36/00* (2009.01)
*H04L 12/24* (2006.01)
(Continued)

(52) U.S. Cl.
CPC ......... *H04W 36/0033* (2013.01); *H04L 29/06* (2013.01); *H04L 41/046* (2013.01);
(Continued)

(58) Field of Classification Search
None
See application file for complete search history.

(56) References Cited

U.S. PATENT DOCUMENTS

| 2010/0027497 A1* | 2/2010 | Pelletier | H04W 28/06 370/329 |
| 2010/0195621 A1* | 8/2010 | Kekki | H04W 48/17 370/332 |

(Continued)

FOREIGN PATENT DOCUMENTS

| CN | 101026546 A | 8/2007 |
| CN | 103155508 A | 6/2013 |
| CN | 103155518 A | 6/2013 |

OTHER PUBLICATIONS

Ford et al., "TCP Extensions for Multipath Operation with Multiple Addresses," Experimental Request for comments 6824, pp. 1-64, Internet Engineering Task Force (Jan. 2013).

*Primary Examiner* — Saba Tsegaye
(74) *Attorney, Agent, or Firm* — Leydig, Voit & Mayer, Ltd.

(57) ABSTRACT

The present disclosure provides a method and an apparatus for managing mobility of an MPTCP connection. The method includes: receiving a message that is sent by the source MPTCP agent and that carries an MPTCP context of UE; and saving the MPTCP context, and performing an MPTCP data transmission operation or an MPTCP management and control operation for the UE according to the saved MPTCP context. Embodiments of the present disclosure implement that, in a scenario in which both a source MPTCP agent and a destination MPTCP agent are deployed at a RAN side, when UE moves from a radio access device on which the source MPTCP agent is deployed to a radio access device on which the destination MPTCP agent is deployed, an MPTCP connection is maintained or the destination MPTCP agent can continue to perform a management and control operation.

17 Claims, 5 Drawing Sheets

(51) Int. Cl.
*H04W 36/08* (2009.01)
*H04L 29/06* (2006.01)
*H04W 64/00* (2009.01)
*H04W 80/06* (2009.01)

(52) U.S. Cl.
CPC .......... *H04W 36/08* (2013.01); *H04W 64/00* (2013.01); *H04W 80/06* (2013.01)

(56) References Cited

U.S. PATENT DOCUMENTS

| | | |
|---|---|---|
| 2012/0093150 A1 | 4/2012 | Kini |
| 2013/0191536 A1 | 7/2013 | Noldus et al. |
| 2014/0064249 A1 | 3/2014 | Lee et al. |
| 2015/0131535 A1* | 5/2015 | Wallentin ............... H04W 76/15 370/329 |
| 2015/0215225 A1* | 7/2015 | Mildh .................... H04L 69/14 370/236 |
| 2015/0263959 A1* | 9/2015 | Patwardhan .......... H04L 47/193 370/235 |

* cited by examiner

METHOD AND APPARATUS FOR MANAGING MOBILITY OF MPTCP CONNECTION

CROSS-REFERENCE TO RELATED APPLICATIONS

This application is a continuation of International Application No. PCT/CN2014/076120, filed on Apr. 24, 2014, the disclosure of which is hereby incorporated by reference in its entirety.

TECHNICAL FIELD

The present disclosure relates to the communications field, and in particular, to a method and an apparatus for managing mobility of an MPTCP connection.

BACKGROUND

With the rapid development of network technologies and terminal technologies, a volume of network information also gets increasingly large. Generally, user terminals support multiple communication manners. For example, a terminal supports both Wireless Fidelity (WiFi) communication and the 3rd Generation Partnership Project (3GPP) standard. However, the conventional Transmission Control Protocol (TCP) uses a single path for transmission, which imposes a restriction that at present, two links cannot serve a same service simultaneously, resulting in resource waste. In addition, link interruption of an underlying IP route may cause disconnection of a TCP connection, which further results in that service continuity is affected. To resolve these problems, the Multipath Transmission Control Protocol (MPTCP) emerges. MPTCP can provide a user with larger bandwidth by providing multiple paths, and can ensure that, when a link of a terminal is faulty, another link seamlessly takes over a service, thereby ensuring service continuity.

In the prior art, MPTCP is an end-to-end protocol. Generally, an MPTCP agent is introduced in two scenarios. In a first scenario, one end of two communication ends does not support MPTCP. In this case, by using an MPTCP agent, a user can enjoy benefits of MPTCP as early as possible. However, in a mobile communications network, if MPTCP agents are deployed at a radio access network (RAN) side, when UE moves from a radio access device on which a source MPTCP agent is deployed to a radio access device on which a destination MPTCP agent is deployed, that is, when the UE moves across MPTCP agents, an MPTCP connection cannot be maintained, which also affects continuity of a service transmitted by using the MPTCP connection. In a second scenario, both communication ends support MPTCP. In this case, a transparent MPTCP agent is used at a RAN side and can be used to execute a management and control operation, to meet a requirement that an operator expects to control and manage an MPTCP connection according to factors such as system load and link quality. A factor such as system load congestion or balancing is considered in the foregoing management and control operation, and the transparent MPTCP agent proactively sends control plane signaling to delete a corresponding TCP sub-flow. Alternatively, a factor such as system load congestion or balancing is considered in the foregoing management and control operation, and values of some fields in interaction signaling involved in a TCP sub-flow creation process are manually modified by using the transparent MPTCP agent, to manually prevent establishment of a TCP sub-flow. However, when UE moves from a radio access device on which a source MPTCP agent is deployed to a radio access device on which a destination MPTCP agent is deployed, that is, when the UE moves across MPTCP agents, continuity of a service transmitted by using an MPTCP connection is not affected, but because there is no related MPTCP connection information at a destination MPTCP agent side, the destination MPTCP agent cannot execute a management and control operation.

SUMMARY

Embodiments of the present disclosure provide a method and an apparatus for managing mobility of an MPTCP connection, to implement that, in a scenario in which both a source MPTCP agent and a destination MPTCP agent are deployed at a RAN side, when UE moves from a radio access device on which the source MPTCP agent is deployed to a radio access device on which the destination MPTCP agent is deployed, an MPTCP connection is maintained, which ensures that service continuity is not affected when the UE moves across MPTCP agents or ensures that the destination MPTCP agent can continue to perform a management and control operation.

According to a first aspect, an embodiment of the present disclosure provides a method for managing mobility of an MPTCP connection, where the method is applied to a scenario in which UE moves from a radio access device on which the source MPTCP agent is deployed to a radio access device on which the destination MPTCP agent is deployed, and the destination MPTCP agent performs the following steps:

receiving a message that is sent by the source MPTCP agent and that carries an MPTCP context of the UE; and saving the MPTCP context, and performing an MPTCP data transmission operation or an MPTCP management and control operation for the UE according to the saved MPTCP context.

According to the first aspect, in a first possible implementation manner, in the performing an MPTCP data transmission operation for the UE according to the saved MPTCP context, the saved MPTCP context includes MPTCP connection information, TCP connection information, and an association relationship between an MPTCP connection corresponding to the MPTCP connection information and a TCP connection corresponding to the TCP connection information, where the MPTCP connection information is related information about an MPTCP connection between the source MPTCP agent and one end of two communication ends, and the TCP connection information is related information about a TCP connection between the source MPTCP agent and the other end of the two communication ends.

According to the first aspect, in a second possible implementation manner, in the performing a management and control operation for the UE according to the saved MPTCP context, the saved MPTCP context includes related information about an MPTCP connection between two communication ends, and management and control related information required for performing the management and control operation.

According to the first possible implementation manner of the first aspect, in a third possible implementation manner, before the receiving a message that is sent by the source MPTCP agent and that carries an MPTCP context of the UE, the method further includes: establishing a transmission path to the source MPTCP agent, where the transmission path includes a signaling link for transmitting the MPTCP context and a user-plane tunnel for forwarding user service data.

According to the second possible implementation manner of the first aspect, in a fourth possible implementation manner, before the receiving a message that is sent by the source MPTCP agent and that carries an MPTCP context, the method further includes: establishing a transmission path to the source MPTCP agent, where the transmission path includes a signaling link for transmitting the MPTCP context.

According to the first aspect, in a fifth possible implementation manner, after the receiving a message that is sent by the source MPTCP agent and that carries an MPTCP context of the UE, the method further includes: sending a response message to the source MPTCP agent.

According to the first possible implementation manner of the first aspect, in a sixth possible implementation manner, the MPTCP connection information includes but is not limited to any piece of or any combination of the following information: key Key information and token Token information of a local end of the MPTCP connection as well as key Key information and token Token information of a remote end of the MPTCP connection, available address information of the two communication ends of the MPTCP connection, information about a service data transmit end of the MPTCP connection, information about a service data receive end of the MPTCP connection, information about whether a data sequence signaling (DSS) option needs to carry a checksum, information about multiple sub-flows included in the MPTCP connection, information about an algorithm related to the MPTCP connection, or a mapping relationship between a data sequence number (DSN) and a sub-flow sequence number (SSN) that are of the MPTCP connection; and the TCP connection information includes but is not limited to any piece of or any combination of the following information: four-tuple information of the TCP connection, information about a service data transmit end of the TCP connection, or information about a service data receive end of the TCP connection.

According to the first aspect, or the first, second, third, fourth, fifth, or sixth possible implementation manner of the first aspect, in a seventh possible implementation manner, the receiving a message that is sent by the source MPTCP agent and that carries an MPTCP context is specifically: receiving, through the established signaling link, the message that carries the MPTCP context; or creating a signaling link by using a local newly-defined MPTCP-AP protocol layer and an MPTCP-AP protocol layer of the source MPTCP agent, and receiving, through the created signaling link, the message that carries the MPTCP context.

According to a second aspect, an embodiment of the present disclosure provides a method for managing mobility of an MPTCP connection, where the method is applied to a scenario in which UE moves from a radio access device on which the source MPTCP agent is deployed to a radio access device on which the destination MPTCP agent is deployed, and the source MPTCP agent performs the following steps:

sending the destination MPTCP agent a message that carries an MPTCP context of the UE; and receiving a response message sent by the MPTCP agent, to determine that the destination MPTCP agent has received the message that carries the MPTCP context of the UE and can perform an MPTCP data transmission operation or an MPTCP management and control operation for the UE according to the MPTCP context.

According to the second aspect, in a first possible implementation manner, in the performing an MPTCP data transmission operation for the UE according to the MPTCP context, the MPTCP context includes MPTCP connection information, TCP connection information, and an association relationship between an MPTCP connection corresponding to the MPTCP connection information and a TCP connection corresponding to the TCP connection information, where the MPTCP connection information is related information about an MPTCP connection between the source MPTCP agent and one end of two communication ends, and the TCP connection information is related information about a TCP connection between the source MPTCP agent and the other end of the two communication ends.

According to the second aspect, in a second possible implementation manner, in the performing a management and control operation for the UE according to the MPTCP context, the MPTCP context includes related information about an MPTCP connection between two communication ends, and management and control related information required for performing the management and control operation.

According to the first possible implementation manner of the second aspect, in a third possible implementation manner, after the receiving a response message sent by the MPTCP agent, the method further includes: forwarding locally stored user service data of the UE to the destination MPTCP agent.

According to the first possible implementation manner of the second aspect, in a fourth possible implementation manner, the MPTCP connection information includes but is not limited to any piece of or any combination of the following information: key Key information and token Token information of a local end of the MPTCP connection as well as key Key information and token Token information of a remote end of the MPTCP connection, available address information of the two communication ends of the MPTCP connection, information about a service data transmit end of the MPTCP connection, information about a service data receive end of the MPTCP connection, information about whether a data sequence signaling DSS option needs to carry a checksum, information about multiple sub-flows included in the MPTCP connection, information about an algorithm related to the MPTCP connection, or a mapping relationship between a data sequence number DSN and a sub-flow sequence number SSN that are of the MPTCP connection; and the TCP connection information includes but is not limited to any piece of or any combination of the following information: four-tuple information of the TCP connection, information about a service data transmit end of the TCP connection, or information about a service data receive end of the TCP connection.

According to the second aspect, or the first, second, third, or fourth possible implementation manner of the second aspect, in a fifth possible implementation manner, the sending the destination MPTCP agent a message that carries an MPTCP context of the UE is specifically: sending, through an established signaling link, the message that carries the MPTCP context; or creating a signaling link by using a local newly-defined MPTCP-AP protocol layer and an MPTCP-AP protocol layer of the destination MPTCP agent, and sending, through the created signaling link, the message that carries the MPTCP context.

According to a third aspect, an embodiment of the present disclosure provides an apparatus for managing mobility of an MPTCP connection, where the apparatus is applied to a scenario in which UE moves from a radio access device on which the source MPTCP agent is deployed to a radio access device on which the destination MPTCP agent is deployed, and the apparatus includes:

a receiving unit, configured to receive a message that is sent by the source MPTCP agent and that carries an MPTCP context of the UE; and a processing unit, configured to save the MPTCP context, and perform an MPTCP data transmission operation or an MPTCP management and control operation for the UE according to the saved MPTCP context.

According to the third aspect, in a first possible implementation manner, in the performing, by the processing unit, an MPTCP data transmission operation for the UE according to the saved MPTCP context, the saved MPTCP context includes MPTCP connection information, TCP connection information, and an association relationship between an MPTCP connection corresponding to the MPTCP connection information and a TCP connection corresponding to the TCP connection information, where the MPTCP connection information is related information about an MPTCP connection between the source MPTCP agent and one end of two communication ends, and the TCP connection information is related information about a TCP connection between the source MPTCP agent and the other end of the two communication ends.

According to the third aspect, in a second possible implementation manner, in the performing, by the processing unit, a management and control operation for the UE according to the saved MPTCP context, the saved MPTCP context includes related information about an MPTCP connection between two communication ends, and management and control related information required for performing the management and control operation.

According to the first possible implementation manner of the third aspect, in a third possible implementation manner, the apparatus further includes: a first establishment unit, configured to establish a transmission path to the source MPTCP agent, where the transmission path includes a signaling link for transmitting the MPTCP context and a user-plane tunnel for forwarding user service data.

According to the second possible implementation manner of the third aspect, in a fourth possible implementation manner, the apparatus further includes: a second establishment unit, configured to establish a transmission path to the source MPTCP agent, where the transmission path includes a signaling link for transmitting the MPTCP context.

According to the third aspect, in a fifth possible implementation manner, the apparatus further includes: a sending unit, configured to send a response message to the source MPTCP agent.

According to the first possible implementation manner of the third aspect, in a sixth possible implementation manner, the MPTCP connection information includes but is not limited to any piece of or any combination of the following information: key Key information and token Token information of a local end of the MPTCP connection as well as key Key information and token Token information of a remote end of the MPTCP connection, available address information of the two communication ends of the MPTCP connection, information about a service data transmit end of the MPTCP connection, information about a service data receive end of the MPTCP connection, information about whether a data sequence signaling DSS option needs to carry a checksum, information about multiple sub-flows included in the MPTCP connection, information about an algorithm related to the MPTCP connection, or a mapping relationship between a data sequence number DSN and a sub-flow sequence number SSN that are of the MPTCP connection; and the TCP connection information includes but is not limited to any piece of or any combination of the following information: four-tuple information of the TCP connection, information about a service data transmit end of the TCP connection, or information about a service data receive end of the TCP connection.

According to the third aspect, or the first, second, third, fourth, fifth, or sixth possible implementation manner of the third aspect, in a seventh possible implementation manner, the receiving unit is specifically configured to: receive, through the established signaling link, the message that carries the MPTCP context; or create a signaling link by using a local newly-defined MPTCP-AP protocol layer and an MPTCP-AP protocol layer of the source MPTCP agent, and receive, through the created signaling link, the message that carries the MPTCP context.

According to a fourth aspect, an embodiment of the present disclosure provides an apparatus for managing mobility of an MPTCP connection, where the apparatus is applied to a scenario in which UE moves from a radio access device on which the source MPTCP agent is deployed to a radio access device on which the destination MPTCP agent is deployed, and the apparatus includes:

a sending unit, configured to send the destination MPTCP agent a message that carries an MPTCP context of the UE;

a receiving unit, configured to receive a response message sent by the MPTCP agent; and a determining unit, configured to determine that the destination MPTCP agent has received the message that carries the MPTCP context of the UE and can perform an MPTCP data transmission operation or an MPTCP management and control operation for the UE according to the MPTCP context.

According to the fourth aspect, in a first possible implementation manner, in the performing, by the determining unit, an MPTCP data transmission operation for the UE according to the MPTCP context, the MPTCP context includes MPTCP connection information, TCP connection information, and an association relationship between an MPTCP connection corresponding to the MPTCP connection information and a TCP connection corresponding to the TCP connection information, where the MPTCP connection information is related information about an MPTCP connection between the source MPTCP agent and one end of two communication ends, and the TCP connection information is related information about a TCP connection between the source MPTCP agent and the other end of the two communication ends.

According to the fourth aspect, in a second possible implementation manner, in the performing, by the determining unit, a management and control operation for the UE according to the MPTCP context, the MPTCP context includes related information about an MPTCP connection between two communication ends, and management and control related information required for performing the management and control operation.

According to the first possible implementation manner of the fourth aspect, in a third possible implementation manner, the sending unit is further configured to forward locally stored user service data of the UE to the destination MPTCP agent.

According to the first possible implementation manner of the fourth aspect, in a fourth possible implementation manner, the MPTCP connection information includes but is not limited to any piece of or any combination of the following information: key Key information and token Token information of a local end of the MPTCP connection as well as key Key information and token Token information of a remote end of the MPTCP connection, available address information of the two communication ends of the MPTCP connection, information about a service data transmit end of the MPTCP connection, information about a service data receive end of the MPTCP connection, information about whether a data sequence signaling DSS option needs to carry a checksum, information about multiple sub-flows included in the MPTCP connection, information about an algorithm related to the MPTCP connection, or a mapping relationship between a data sequence number DSN and a sub-flow sequence number SSN that are of the MPTCP connection; and the TCP connection information includes but is not limited to any piece of or any combination of the following information: four-tuple information of the TCP connection, information about a service data transmit end of the TCP connection, or information about a service data receive end of the TCP connection.

According to the fourth aspect, or the first, second, third, or fourth possible implementation manner of the fourth aspect, in a fifth possible implementation manner, the sending unit is specifically configured to: send, through an established signaling link, the message that carries the MPTCP context; or create a signaling link by using a local newly-defined MPTCP-AP protocol layer and an MPTCP-AP protocol layer of the destination MPTCP agent, and send, through the created signaling link, the message that carries the MPTCP context.

According to a fifth aspect, an embodiment of the present disclosure provides a destination MPTCP agent, where the destination MPTCP agent is applied to a scenario in which UE moves from a radio access device on which the source MPTCP agent is deployed to a radio access device on which the destination MPTCP agent is deployed, and the destination MPTCP agent includes:

a network interface;
a memory;
a processor; and
a software module physically stored in the memory, where the software module includes an instruction that can be used to enable the processor and the destination MPTCP agent to execute the following process:

receiving a message that is sent by the source MPTCP agent and that carries an MPTCP context of the UE; and saving the MPTCP context, and performing an MPTCP data transmission operation or an MPTCP management and control operation for the UE according to the saved MPTCP context.

According to the fifth aspect, in a first possible implementation manner, in the performing, by the processor and the destination MPTCP agent, an MPTCP data transmission operation for the UE according to the saved MPTCP context, the saved MPTCP context includes MPTCP connection information, TCP connection information, and an association relationship between an MPTCP connection corresponding to the MPTCP connection information and a TCP connection corresponding to the TCP connection information, where the MPTCP connection information is related information about an MPTCP connection between the source MPTCP agent and one end of two communication ends, and the TCP connection information is related information about a TCP connection between the source MPTCP agent and the other end of the two communication ends.

According to the fifth aspect, in a second possible implementation manner, in the performing, by the processor and the destination MPTCP agent, a management and control operation for the UE according to the saved MPTCP context, the saved MPTCP context includes related information about an MPTCP connection between two communication ends, and management and control related information required for performing the management and control operation.

According to the first possible implementation manner of the fifth aspect, in a third possible implementation manner, the software module further includes an instruction that can be used to enable the processor and the destination MPTCP agent to execute the following process: establishing a transmission path to the source MPTCP agent, where the transmission path includes a signaling link for transmitting the MPTCP context and a user-plane tunnel for forwarding user service data.

According to the second possible implementation manner of the fifth aspect, in a fourth possible implementation manner, the software module further includes an instruction that can be used to enable the processor and the destination MPTCP agent to execute the following process: establishing a transmission path to the source MPTCP agent, where the transmission path includes a signaling link for transmitting the MPTCP context.

According to the fifth aspect, in a fifth possible implementation manner, the software module further includes an instruction that can be used to enable the processor and the destination MPTCP agent to execute the following process: sending a response message to the source MPTCP agent.

According to the first possible implementation manner of the fifth aspect, in a sixth possible implementation manner, the MPTCP connection information includes but is not limited to any piece of or any combination of the following information: key Key information and token Token information of a local end of the MPTCP connection as well as key Key information and token Token information of a remote end of the MPTCP connection, available address information of the two communication ends of the MPTCP connection, information about a service data transmit end of the MPTCP connection, information about a service data receive end of the MPTCP connection, information about whether a data sequence signaling DSS option needs to carry a checksum, information about multiple sub-flows included in the MPTCP connection, information about an algorithm related to the MPTCP connection, or a mapping relationship between a data sequence number DSN and a sub-flow sequence number SSN that are of the MPTCP connection; and the TCP connection information includes but is not limited to any piece of or any combination of the following information: four-tuple information of the TCP connection, information about a service data transmit end of the TCP connection, or information about a service data receive end of the TCP connection.

According to the fifth aspect, or the first, second, third, fourth, fifth, or sixth possible implementation manner of the fifth aspect, in a seventh possible implementation manner, the instruction for the processor and the destination MPTCP agent to execute the process of receiving a message that is sent by the source MPTCP agent and that carries an MPTCP context is specifically: receiving, through the established signaling link, the message that carries the MPTCP context; or creating a signaling link by using a local newly-defined MPTCP-AP protocol layer and an MPTCP-AP protocol layer of the source MPTCP agent, and receiving, through the created signaling link, the message that carries the MPTCP context.

According to a sixth aspect, an embodiment of the present disclosure provides a source MPTCP agent, where the source MPTCP agent is applied to a scenario in which UE moves from a radio access device on which the source MPTCP agent is deployed to a radio access device on which the destination MPTCP agent is deployed, and the source MPTCP agent includes:

a network interface;

a memory;

a processor; and a software module physically stored in the memory, where the software module includes an instruction that can be used to enable the processor and the source MPTCP agent to execute the following process:

sending the destination MPTCP agent a message that carries an MPTCP context of the UE; and receiving a response message sent by the MPTCP agent, to determine that the destination MPTCP agent has received the message that carries the MPTCP context of the UE and can perform an MPTCP data transmission operation or an MPTCP management and control operation for the UE according to the MPTCP context.

According to the sixth aspect, in a first possible implementation manner, in the performing, by the processor and the source MPTCP agent, an MPTCP data transmission operation for the UE according to the MPTCP context, the MPTCP context includes MPTCP connection information, TCP connection information, and an association relationship between an MPTCP connection corresponding to the MPTCP connection information and a TCP connection corresponding to the TCP connection information, where the MPTCP connection information is related information about an MPTCP connection between the source MPTCP agent and one end of two communication ends, and the TCP connection information is related information about a TCP connection between the source MPTCP agent and the other end of the two communication ends.

According to the sixth aspect, in a second possible implementation manner, in the performing, by the processor and the source MPTCP agent, a management and control operation for the UE according to the MPTCP context, the MPTCP context includes related information about an MPTCP connection between two communication ends, and management and control related information required for performing the management and control operation.

According to the first possible implementation manner of the sixth aspect, in a third possible implementation manner, the software module further includes an instruction that can be used to enable the processor and the source MPTCP agent to execute the following process: forwarding locally stored user service data of the UE to the destination MPTCP agent.

According to the first possible implementation manner of the sixth aspect, in a fourth possible implementation manner, the MPTCP connection information includes but is not limited to any piece of or any combination of the following information: key Key information and token Token information of a local end of the MPTCP connection as well as key Key information and token Token information of a remote end of the MPTCP connection, available address information of the two communication ends of the MPTCP connection, information about a service data transmit end of the MPTCP connection, information about a service data receive end of the MPTCP connection, information about whether a data sequence signaling DSS option needs to carry a checksum, information about multiple sub-flows included in the MPTCP connection, information about an algorithm related to the MPTCP connection, or a mapping relationship between a data sequence number DSN and a sub-flow sequence number SSN that are of the MPTCP connection; and the TCP connection information includes but is not limited to any piece of or any combination of the following information: four-tuple information of the TCP connection, information about a service data transmit end of the TCP connection, or information about a service data receive end of the TCP connection.

According to the sixth aspect, or the first, second, third, or fourth possible implementation manner of the sixth aspect, in a fifth possible implementation manner, the instruction for the processor and the source MPTCP agent to execute the process of sending the destination MPTCP agent an MPTCP context that carries the UE is specifically: sending, through an established signaling link, the message that carries the MPTCP context; or creating a signaling link by using a local newly-defined MPTCP-AP protocol layer and an MPTCP-AP protocol layer of the destination MPTCP agent, and sending, through the created signaling link, the message that carries the MPTCP context.

In the method and the apparatus for managing mobility of an MPTCP connection according to the embodiments of the present disclosure, a destination MPTCP agent receives a message that is sent by the source MPTCP agent and that carries an MPTCP context; and saves the MPTCP context, and performs an MPTCP data transmission or management and control operation according to the saved MPTCP context. This can implement that, in a scenario in which both a source MPTCP agent and a destination MPTCP agent are deployed at a RAN side, when UE moves from a radio access device on which the source MPTCP is deployed to a radio access device on which the destination MPTCP agent is deployed, an MPTCP connection is maintained, which ensures that service continuity is not affected when the UE moves across MPTCP agents or ensures that the destination MPTCP agent can continue to perform a management and control operation.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
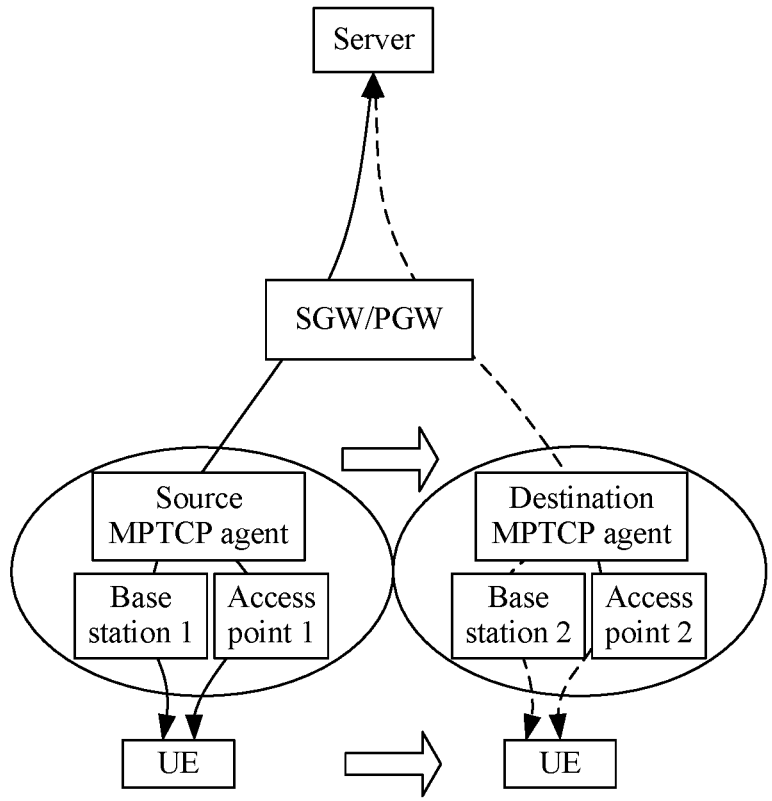
FIG. 1 is a schematic diagram of an application scenario of a method for managing mobility of an MPTCP connection according to an embodiment of the present disclosure.

In practical application, a method and an apparatus for managing mobility of an MPTCP connection that are provided in the embodiments of the present disclosure are applicable to a scenario in which UE moves from a radio access device on which the source MPTCP agent is deployed to a radio access device on which the destination MPTCP agent is deployed. FIG. 1 is a schematic diagram of an application scenario of a method for managing mobility of an MPTCP connection according to an embodiment of the present disclosure. As shown in the figure, one side of UE and a server does not support the MPTCP protocol. Therefore, MPTCP agents are introduced, where both a source MPTCP agent and a destination MPTCP agent are located at a radio access network (RAN) side. In the figure, the source MPTCP agent and destination MPTCP may be deployed in different radio access devices such as base stations, may be deployed as an independent network element device and connected to radio access devices, or may be deployed in a manner of being integrated in radio access devices, where the source MPTCP agent and the destination MPTCP agent are configured to control an MPTCP connection and MPTCP data transmission of UE served by the radio access device. In FIG. 1, when the UE moves from the radio access device on which the source MPTCP agent is deployed to the radio access device on which the destination MPTCP agent is deployed, the source MPTCP agent may send the destination MPTCP agent a message that carries an MPTCP context. When receiving the message, the destination MPTCP agent may restore an MPTCP agent scene according to the MPTCP context, that is, move a TCP connection and an MPTCP connection that are established by using the source MPTCP agent to the destination MPTCP agent. This implements that, when the UE moves from the radio access device on which the source MPTCP is deployed to the radio access device on which the destination MPTCP agent is deployed, the MPTCP connection is maintained, which ensures that service continuity is not affected when the UE moves across MPTCP agents.

In addition to the application scenario shown in FIG. 1, the embodiments of the present disclosure are applicable to another application scenario in which both communication ends support MPTCP, but a transparent MPTCP agent is used at a RAN side, where the transparent MPTCP agent is configured to perform a management and control operation. In this scenario, when UE moves across MPTCP agents, when receiving a message that carries an MPTCP context, a destination MPTCP agent may restore an MPTCP agent scene according to an MPTCP context, that is, apply the MPTCP context of a source MPTCP agent to the destination MPTCP agent. This implements that, when the UE moves from a radio access device on which the source MPTCP is deployed to a radio access device on which the destination MPTCP agent is deployed, the destination MPTCP agent can normally perform a management and control operation afterward.

Two communication ends mentioned in this application file refer to two terminal hosts that need to communicate. For example, in FIG. 1, the two communication ends refer to the UE and the server.

It should be noted that an MPTCP agent represents a logical functional entity at a RAN side, and a deployment location of the MPTCP agent is not limited. The MPTCP agent may be deployed alone or may be deployed in a network management device, a base station controller (BSC), a radio network controller (RNC), an access controller (AC), an evolved NodeB eNodeB, a base transceiver station (BTS), or a base station NodeB. In other words, the MPTCP agent may be an independent device, or may be deployed in another device.

Figure 2:
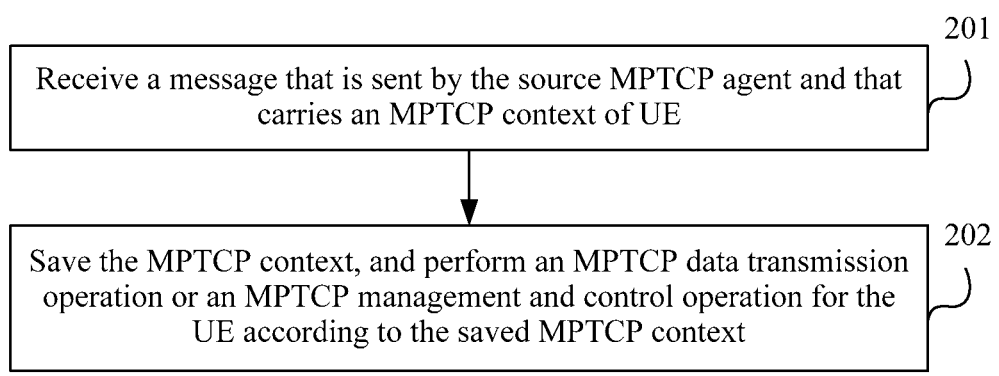
FIG. 2 is a flowchart of a method for managing mobility of an MPTCP connection according to an embodiment of the present disclosure.

FIG. 2 is a flowchart of a method for managing mobility of an MPTCP connection according to an embodiment of the present disclosure. This embodiment is executed by a destination MPTCP agent and is applied to a scenario in which UE moves from a radio access device on which the source MPTCP agent is deployed to a radio access device on which the destination MPTCP agent is deployed. As shown in the figure, this embodiment includes the following execution steps:

Step 201: Receive a message that is sent by the source MPTCP agent and that carries an MPTCP context.

For the application scenario shown in FIG. 1, one side of the UE and the server does not support the MPTCP protocol. In the following example used to describe the technical solution in this embodiment of the present disclosure, the UE supports the MPTCP protocol but the server does not support the MPTCP protocol. Certainly, the technical solution is also applicable to a case in which the server supports the MPTCP protocol but the UE does not support the MPTCP protocol, and a case in which both the server and the UE support the MPTCP protocol.

Figure 3:
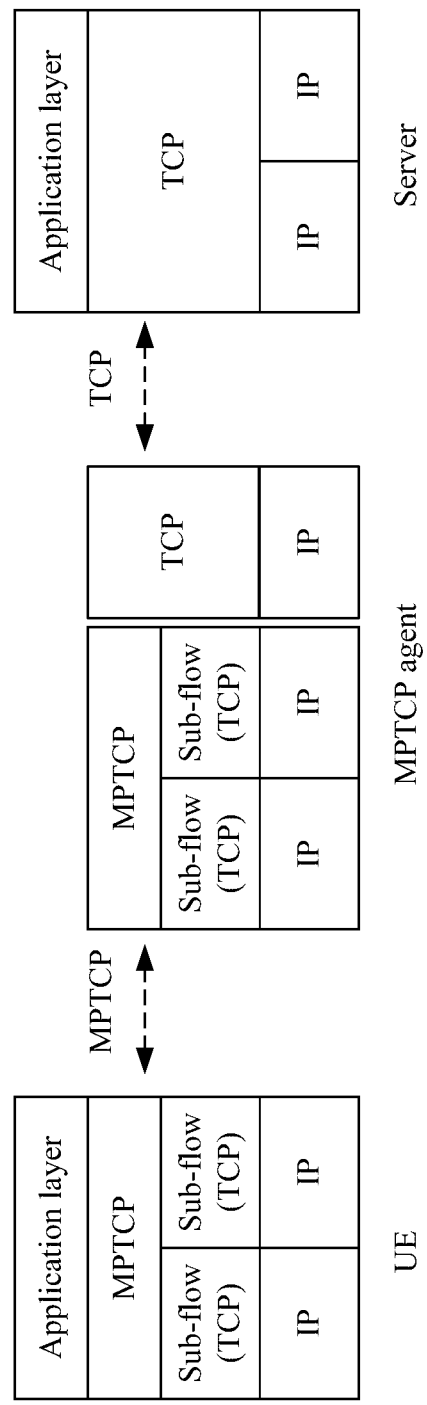
FIG. 3 is a schematic diagram of a protocol stack of functional entities exchanging information in a method for managing mobility of an MPTCP connection according to an embodiment of the present disclosure.

FIG. 3 is a schematic diagram of a protocol stack of functional entities exchanging information in a method for managing mobility of an MPTCP connection according to an embodiment of the present disclosure. In the figure, the UE supports the MPTCP protocol and establishes an MPTCP connection to an MPTCP agent, where the MPTCP connection includes multiple sub-flows; and the server does not support the MPTCP protocol and establishes a conventional TCP connection to the MPTCP agent.

For the scenario, shown in FIG. 1, in which only one communication end supports the MPTCP protocol, a saved MPTCP context includes MPTCP connection information, TCP connection information, and an association relationship between an MPTCP connection corresponding to the MPTCP connection information and a TCP connection corresponding to the TCP connection information. The MPTCP connection information includes but is not limited to any piece of or any combination of the following information: key Key information and token Token information of a local end of the MPTCP connection as well as key Key information and token Token information of a remote end of the MPTCP connection, available address information of two communication ends of the MPTCP connection, information about a service data transmit end of the MPTCP connection, information about a service data receive end of the MPTCP connection, information about whether a data sequence signaling DSS option needs to carry a checksum, information about multiple sub-flows included in the MPTCP connection, information about an algorithm related to the MPTCP connection, or a mapping relationship between a data sequence number DSN and a sub-flow sequence number SSN that are of the MPTCP connection. The TCP connection information includes but is not limited to any piece of or any combination of the following information: four-tuple information of the TCP connection, information about a service data transmit end of the TCP connection, or information about a service data receive end of the TCP connection.

For a scenario in which both communication ends support the MPTCP protocol, the MPTCP context includes related information about an MPTCP connection between the two communication ends, and management and control related information required for performing a management and control operation.

Specifically, the information about a service data transmit end of the MPTCP connection may include but is not limited to any piece of or any combination of the following information: a data sequence number (DSN) corresponding to an unacknowledged data packet that is first sent, a DSN corresponding to a next to-be-sent data packet, a send window, a congestion window, a send buffer size, or the like. The information about a service data receive end of the MPTCP connection may include a DSN corresponding to a next in-order data packet expected to be received, a receive window, a receive buffer size, and the like. The information about multiple sub-flows included in the MPTCP connection may include but is not limited to any piece of or any combination of the following information: a sub-flow backup flag bit in a downlink direction of and a sub-flow backup flag bit in an uplink direction of an air interface of a sub-flow; TCP four tuples of a sub-flow; information about a service data transmit end of a sub-flow, for example, a sub-flow sequence number (SSN) corresponding to an unacknowledged data packet that is first sent, an SSN corresponding to a next to-be-sent data packet, and a congestion window; or information about a service data receive end of a sub-flow, for example, an SSN corresponding to a next in-order data packet expected to be received, and a receive window.

It should be noted that the mentioned sub-flow backup flag bit in a downlink direction of an air interface of a sub-flow in this application file refers to a flag bit indicating whether a data transmit end of the sub-flow uses the TCP sub-flow as a backup when sending data to a data receive end during downlink data transmission; the sub-flow backup flag bit in an uplink direction of an air interface of a sub-flow refers to a flag bit indicating whether a data transmit end of the sub-flow uses the TCP sub-flow as a backup when sending data to a data receive end during uplink data transmission.

The information about a service data transmit end of the TCP connection may include but is not limited to any piece of or any combination of the following information: a sequence number corresponding to an unacknowledged data packet that is first sent, a sequence number corresponding to a next to-be-sent data packet, a send window, a congestion window, a send buffer size, or the like. The information about a service data receive end of the TCP connection may include but is not limited to any piece of or any combination of the following information: a sequence number corresponding to a next in-order data packet expected to be received, a receive window, a receive buffer size, or the like.

The MPTCP context may be transmitted in the following manners: In one manner, an existing signaling link is used, for example, an S1 signaling link or an X2 signaling connection on an LTE network, where a transport layer is unchanged; and a newly defined 3GPP message, that is, an MPTCP HandOver Request message, is added to an application protocol layer to carry the MPTCP context, or an IE is added to an existing 3GPP protocol message to carry the MPTCP context. In another manner, a transport layer technology is utilized. For example, a TCP link is created; an MPTCP-AP protocol layer (which, for example, on an LTE network, is an MPTCP-AP protocol layer similar to an S1-AP/X2-AP protocol layer) is newly defined on an application protocol layer above a transport layer; a new message, that is, an MPTCP HandOver Request message, is defined on the MPTCP-AP protocol layer; and the new message is used to carry the MPTCP context.

Step 202: Save the MPTCP context, and perform an MPTCP data transmission or management and control operation according to the saved MPTCP context.

In the application scenario shown in FIG. 1, after locally saving context information of a source MPTCP connection, the destination MPTCP agent may establish an association relationship between the MPTCP connection between the destination MPTCP agent and the UE, and the TCP connection between the destination MPTCP agent and the server, to facilitate normal service data transmission subsequently.

In the scenario in which both communication ends support the MPTCP protocol, after locally saving context information of a source MPTCP connection, the destination MPTCP agent may perform a management and control operation according to the saved MPTCP context.

In this embodiment of the present disclosure, a destination MPTCP agent receives a message that is sent by the source MPTCP agent and that carries an MPTCP context; and saves the MPTCP context, and performs an MPTCP data transmission or management and control operation according to the saved MPTCP context. This can implement that, in a scenario in which both a source MPTCP agent and a destination MPTCP agent are deployed at a RAN side, in the scenario shown in FIG. 1, when UE moves from a radio access device on which the source MPTCP agent is deployed to a radio access device on which the destination MPTCP agent is deployed, an MPTCP connection is maintained, which ensures that service continuity is not affected when the UE moves across MPTCP agents, or ensures that the destination MPTCP agent can continue to perform a management and control operation when both communication ends support MPTCP.

Figure 4:
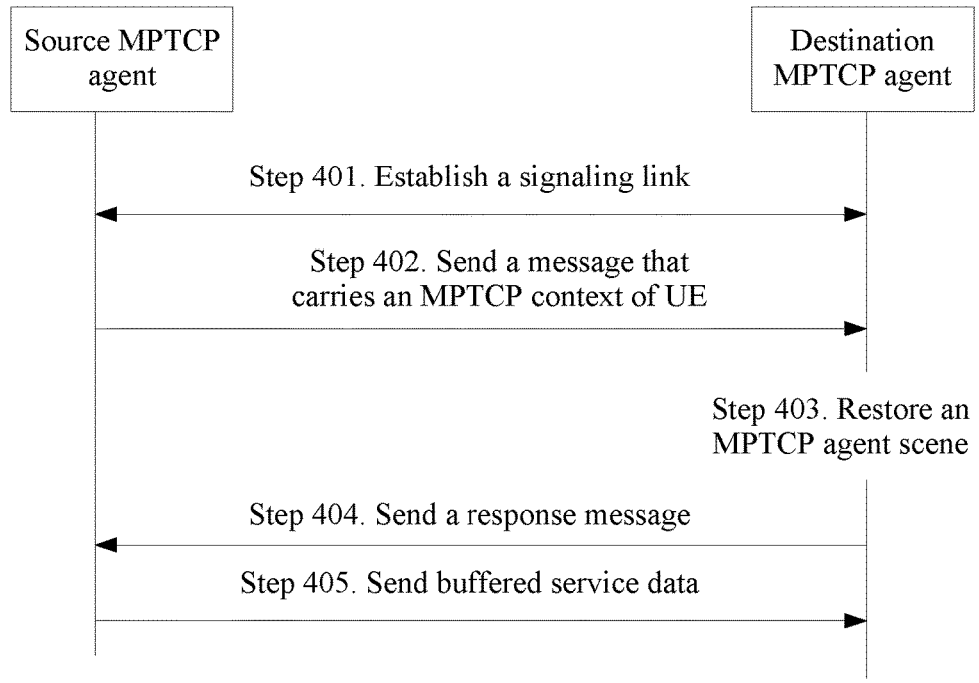
FIG. 4 is a schematic diagram of information exchange between functional entities in a method for managing mobility of an MPTCP connection according to an embodiment of the present disclosure.

FIG. 4 is a schematic diagram of information exchange between functional entities in a method for managing mobility of an MPTCP connection according to an embodiment of the present disclosure. As shown in the figure, this embodiment includes the following steps:

Step 401: A source MPTCP agent establishes a transmission path to a destination MPTCP agent.

To implement the technical solution provided in this embodiment of the present disclosure, a transmission path needs to exist between all MPTCP agents having a neighboring relationship, where the transmission path includes a signaling link for exchanging an MPTCP context.

When being activated, the source MPTCP agent may initiate a signaling link establishment request to a neighboring destination MPTCP agent, to establish a signaling link between the source MPTCP agent and the destination MPTCP agent.

The source MPTCP agent can learn, from related configuration information, which neighboring network elements have an MPTCP agent.

For the application scenario shown in FIG. 1, after the signaling link is established, the MPTCP agents may further use the signaling link to negotiate a parameter required for establishing a user-plane tunnel. For example, if the user-plane tunnel is based on a TCP connection, a TCP port number used for establishing the user-plane tunnel can be negotiated on the signaling link. After the source MPTCP agent and the destination MPTCP agent complete negotiation of the parameter required for establishing the user-plane tunnel, the user-plane tunnel can be established between the two agents, where the user-plane tunnel is used for subsequent service data forwarding and transmission between the two agents in step 405.

For a scenario in which both communication ends support the MPTCP protocol, because service data transmission does not need to be performed between two MPTCP agents, a user-plane tunnel does not need to be established.

Step 402: The source MPTCP agent sends the destination MPTCP agent a message that carries an MPTCP context.

Both the source MPTCP agent and the destination MPTCP agent are deployed at a RAN side. Therefore, in a scenario in which UE moves from a radio access device on which the source MPTCP agent is deployed to a radio access device on which the destination MPTCP agent is deployed, the source MPTCP agent may send the destination MPTCP agent the message that carries the MPTCP context.

For the scenario, shown in FIG. 1, in which only one communication end supports the MPTCP protocol, a saved MPTCP context includes MPTCP connection information, TCP connection information, and an association relationship between an MPTCP connection corresponding to the MPTCP connection information and a TCP connection corresponding to the TCP connection information. The MPTCP connection information includes but is not limited to any piece of or any combination of the following information: key Key information and token Token information of a local end of the MPTCP connection as well as key Key information and token Token information of a remote end of the MPTCP connection, available address information of two communication ends of the MPTCP connection, information about a service data transmit end of the MPTCP connection, information about a service data receive end of the MPTCP connection, information about whether a data sequence signaling DSS option needs to carry a checksum, information about multiple sub-flows included in the MPTCP connection, information about an algorithm related to the MPTCP connection, or a mapping relationship between a data sequence number DSN and a sub-flow sequence number SSN that are of the MPTCP connection. The TCP connection information includes but is not limited to any piece of or any combination of the following information: four-tuple information of the TCP connection, information about a service data transmit end of the TCP connection, or information about a service data receive end of the TCP connection.

For a scenario in which both communication ends support the MPTCP protocol, the MPTCP context includes related information about an MPTCP connection between the two communication ends, and management and control related information required for performing a management and control operation.

Specifically, the information about a service data transmit end of the MPTCP connection may include but is not limited to any piece of or any combination of the following information: a data sequence number (DSN) corresponding to an unacknowledged data packet that is first sent, a DSN corresponding to a next to-be-sent data packet, a send window, a congestion window, a send buffer size, or the like. The information about a service data receive end of the MPTCP connection may include a DSN corresponding to a next in-order data packet expected to be received, a receive window, a receive buffer size, and the like. The information about multiple sub-flows included in the MPTCP connection may include but is not limited to any piece of or any combination of the following information: a sub-flow backup flag bit in a downlink direction of and a sub-flow backup flag bit in an uplink direction of an air interface of a sub-flow; TCP four tuples of a sub-flow; information about a service data transmit end of a sub-flow, for example, an SSN corresponding to an unacknowledged data packet that is first sent, an SSN corresponding to a next to-be-sent data packet, and a congestion window; or information about a service data receive end of a sub-flow, for example, an SSN corresponding to a next in-order data packet expected to be received, and a receive window.

The information about a service data transmit end of the TCP connection may include but is not limited to any piece of or any combination of the following information: a sequence number corresponding to an unacknowledged data packet that is first sent, a sequence number corresponding to a next to-be-sent data packet, a send window, a congestion window, a send buffer size, or the like. The information about a service data receive end of the TCP connection may include but is not limited to any piece of or any combination of the following information: a sequence number corresponding to a next in-order data packet expected to be received, a receive window, a receive buffer size, or the like.

The source MPTCP agent may transmit the MPTCP context in two manners: In one manner, an existing signaling link is used, where a transport layer is unchanged; and a newly defined 3GPP message, that is, an MPTCP HandOver Request message, is added to an application protocol layer to carry the MPTCP context, or an IE is added to an existing 3GPP protocol message to carry the MPTCP context. In the other manner, a transport layer technology is utilized. For example, a TCP link is created; an MPTCP-AP protocol layer (which, for example, on an LTE network, is an MPTCP-AP protocol layer similar to an S1-AP/X2 -AP protocol layer) is newly defined on an application protocol layer above a transport layer; a new message, that is, an MPTCP HandOver Request message, is defined on the MPTCP-AP protocol layer; and the new message is used to carry the MPTCP context.

Optionally, when a manner in which an IE, that is, an MPTCP Context IE, is added to an existing 3GPP protocol message to carry the MPTCP context is used, a 3GPP message that carries the new IE is different in a different handover scenario.

Specifically, for a scenario of a handover in an evolved universal terrestrial radio access network (E-UTRAN), if the handover is an X2 -based handover between base stations eNodeBs, a source base station needs to add an MPTCP Context IE to a handover request HANDOVER REQUEST message sent to a destination base station; if the handover is an S1-based handover between eNodeBs, a source base station needs to add an MPTCP Context IE to a handover required HANDOVER REQUIRED message sent to a core network element.

For a scenario of an inter-RAT handover from an E-UTRAN to a universal terrestrial radio access network (UTRAN) or a GSM EDGE radio access network (GERAN), the source MPTCP agent needs to add an MPTCP Context IE to a handover required HANDOVER REQUIRED message sent to a core network element. For a scenario of radio network controller (RNC) relocation in a UTRAN, a source RNC needs to add an MPTCP Context IE to a relocation required RELOCATION REQUIRED message sent to a core network element. For a scenario of an inter-RAT handover from a UTRAN to an E-UTRAN or a GERAN, a source RNC needs to add an MPTCP Context IE to a relocation required RELOCATION REQUIRED message sent to a core network element. For a scenario of a handover between base station subsystems (BSS) in a GERAN, a source BSS needs to add an MPTCP Context IE to a PS handover required PS Handover Required message sent to a core network element. For a scenario of an inter-RAT handover from a GERAN to an E-UTRAN or a UTRAN, a source BSS needs to add an MPTCP Context IE to a PS handover required PS Handover Required message sent to a core network element.

Optionally, the MPTCP Context IE may directly include various content items of the MPTCP context. Alternatively, various content items may be packaged as an MPTCP Handover Request message and exist, in a manner of a transparent container (that is, a Transparent Container in the 3GPP protocol), in the MPTCP Context IE. If the various content items of the MPTCP context are sent in the manner of a transparent container, when content of the MPTCP context needs to be added, deleted, or modified, only a definition of the MPTCP Context IE itself needs to be modified, and it is not required to frequently modify signaling related to an interface such as S1/X2/Iu.

It should be noted that, when the manner in which an IE, that is, an MPTCP Context IE, is added to an existing 3GPP protocol message to carry the MPTCP context is used, the MPTCP context can be transmitted together with a message related to a 3GPP handover, which is relatively convenient. However, in the 3GPP protocol, a handover operation is initiated by a handover initiating network element, such as an eNodeB or an RNC, in a radio access network. If a network element on which an MPTCP agent is located and the handover initiating network element are not located on a same entity, the handover initiating network element cannot easily acquire the MPTCP context, and therefore, the MPTCP context cannot be carried in a message related to a 3GPP handover. Therefore, if the manner in which an IE, that is, an MPTCP Context IE, is added to an existing 3GPP protocol message to carry the MPTCP context is used, to implement the technical solutions in this embodiment of the present disclosure, before the handover operation is performed, the MPTCP agent and the handover initiating network element need to exchange the MPTCP context.

Step 403: The destination MPTCP agent restores an MPTCP agent scene according to the MPTCP context.

In the application scenario shown in FIG. 1, the restoring an MPTCP agent scene mainly includes: establishing, by the destination MPTCP agent after locally saving context information of a source MPTCP connection, an association relationship between an MPTCP connection between the destination MPTCP agent and the UE, and a TCP connection between the destination MPTCP agent and a server, to facilitate normal service data transmission subsequently.

In the scenario in which both communication ends support the MPTCP protocol, the restoring an MPTCP agent scene mainly includes: performing, by the destination MPTCP agent after locally saving context information of a source MPTCP connection, a management and control operation according to the saved MPTCP context.

Step 404: The destination MPTCP agent sends a response message to the source MPTCP agent.

Step 405: The source MPTCP agent sends buffered service data to the destination MPTCP agent.

In the application scenario shown in FIG. 1, after receiving an MPTCP handover response message, if the source MPTCP agent discovers that unsent buffered data exists, the source MPTCP agent may forward the buffered data to the destination MPTCP agent. For downlink data, because of link interruption of an air interface, data needs to be forwarded to the destination MPTCP agent, and then be retransmitted to the UE by the destination MPTCP agent. For uplink data, service data may be sent by the source MPTCP agent to a network side; or may be forwarded by the source MPTCP agent to the destination MPTCP agent, and then be sent to a network side by the destination MPTCP agent.

In the scenario in which both communication ends support the MPTCP protocol, this operation step is not performed. Instead, after step 404, the destination MPTCP agent performs a normal management and control operation.

Therefore, the present disclosure can implement that, in a scenario in which both a source MPTCP agent and a destination MPTCP agent are deployed at a RAN side, in the scenario shown in FIG. 1, when UE moves from a radio access device on which the source MPTCP agent is deployed to a radio access device on which the destination MPTCP agent is deployed, an MPTCP connection is maintained. In addition, service data buffered on the source MPTCP agent can continue to be sent to the destination MPTCP agent, and the destination MPTCP agent continues to forward the service data. Alternatively, in a scenario in which both communication ends support MPTCP, the destination MPTCP agent can perform a normal management and control operation according to a context.

It should be noted that the foregoing embodiment describes a scenario in which UE moves from a radio access device on which a source MPTCP agent is deployed to a radio access device on which a destination MPTCP agent is deployed. In actual application, if the UE moves from the radio access device on which the source MPTCP agent is deployed to a coverage area of another base station, and no MPTCP agent is used on a side of the moved-to another based station, before the UE is handed over, an MPTCP connection and a TCP connection formed under an action of the source MPTCP agent can be first fallen back to conventional TCP connections between two communication ends, and then the UE handover is executed.

Figure 5:
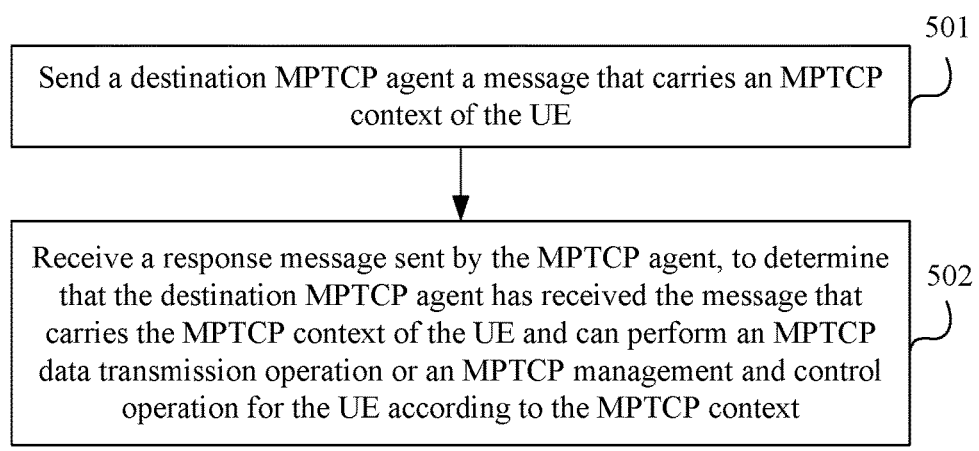
FIG. 5 is a schematic diagram of another method for managing mobility of an MPTCP connection according to an embodiment of the present disclosure.

FIG. 5 is a flowchart of another method for managing mobility of an MPTCP connection according to an embodiment of the present disclosure. This embodiment is executed by a source MPTCP agent and is applied to a scenario in which UE moves from a radio access device on which the source MPTCP agent is deployed to a radio access device on which the destination MPTCP agent is deployed. As shown in the figure, this embodiment includes the following execution steps:

Step 501: Send the destination MPTCP agent a message that carries an MPTCP context of the UE.

To implement the technical solution provided in this embodiment of the present disclosure, a transmission path needs to exist between all MPTCP agents having a neighboring relationship, where the transmission path includes a signaling link for exchanging an MPTCP context.

When being activated, the source MPTCP agent may initiate a signaling link establishment request to a neighboring destination MPTCP agent, to establish a signaling link between the source MPTCP agent and the destination MPTCP agent.

For the application scenario shown in FIG. 1, one side of the UE and the server does not support the MPTCP protocol. In the following example used to describe the technical solution in this embodiment of the present disclosure, the UE supports the MPTCP protocol but the server does not support the MPTCP protocol. Certainly, the technical solution is also applicable to a case in which the server supports the MPTCP protocol but the UE does not support the MPTCP protocol, and a case in which both the server and the UE support the MPTCP protocol.

For the scenario, shown in FIG. 1, in which only one communication end supports the MPTCP protocol, a saved MPTCP context includes MPTCP connection information, TCP connection information, and an association relationship between an MPTCP connection corresponding to the MPTCP connection information and a TCP connection corresponding to the TCP connection information. The MPTCP connection information includes but is not limited to any piece of or any combination of the following information: key Key information and token Token information of a local end of the MPTCP connection as well as key Key information and token Token information of a remote end of the MPTCP connection, available address information of two communication ends of the MPTCP connection, information about a service data transmit end of the MPTCP connection, information about a service data receive end of the MPTCP connection, information about whether a data sequence signaling DSS option needs to carry a checksum, information about multiple sub-flows included in the MPTCP connection, information about an algorithm related to the MPTCP connection, or a mapping relationship between a data sequence number DSN and a sub-flow sequence number SSN that are of the MPTCP connection. The TCP connection information includes but is not limited to any piece of or any combination of the following information: four-tuple information of the TCP connection, information about a service data transmit end of the TCP connection, or information about a service data receive end of the TCP connection.

For a scenario in which both communication ends support the MPTCP protocol, the MPTCP context includes related information about an MPTCP connection between the two communication ends, and management and control related information required for performing a management and control operation.

Specifically, the information about a service data transmit end of the MPTCP connection may include but is not limited to any piece of or any combination of the following information: a DSN corresponding to an unacknowledged data packet that is first sent, a DSN corresponding to a next to-be-sent data packet, a send window, a congestion window, a send buffer size, or the like. The information about a service data receive end of the MPTCP connection may include a DSN corresponding to a next in-order data packet expected to be received, a receive window, a receive buffer size, and the like. The information about multiple sub-flows included in the MPTCP connection may include but is not limited to any piece of or any combination of the following information: a sub-flow backup flag bit in a downlink direction of and a sub-flow backup flag bit in an uplink direction of an air interface of a sub-flow; TCP four tuples of a sub-flow; information about a service data transmit end of a sub-flow, for example, an SSN corresponding to an unacknowledged data packet that is first sent, an SSN corresponding to a next to-be-sent data packet, and a congestion window; or information about a service data receive end of a sub-flow, for example, an SSN corresponding to a next in-order data packet expected to be received, and a receive window.

It should be noted that the mentioned sub-flow backup flag bit in a downlink direction of an air interface of a sub-flow in this application file refers to a flag bit indicating whether a data transmit end of the sub-flow uses the TCP sub-flow as a backup when sending data to a data receive end during downlink data transmission; the sub-flow backup flag bit in an uplink direction of an air interface of a sub-flow refers to a flag bit indicating whether a data transmit end of the sub-flow uses the TCP sub-flow as a backup when sending data to a data receive end during uplink data transmission.

The information about a service data transmit end of the TCP connection may include but is not limited to any piece of or any combination of the following information: a sequence number corresponding to an unacknowledged data packet that is first sent, a sequence number corresponding to a next to-be-sent data packet, a send window, a congestion window, a send buffer size, or the like. The information about a service data receive end of the TCP connection may include but is not limited to any piece of or any combination of the following information: a sequence number corresponding to a next in-order data packet expected to be received, a receive window, a receive buffer size, or the like.

The MPTCP context may be transmitted in the following manners: In one manner, an existing signaling link is used, for example, an S1 signaling link or an X2 signaling connection on an LTE network, where a transport layer is unchanged; and a newly defined 3GPP message, that is, an MPTCP HandOver Request message, is added to an application protocol layer to carry the MPTCP context, or an IE is added to an existing 3GPP protocol message to carry the MPTCP context. In another manner, a transport layer technology is utilized. For example, a TCP link is created; an MPTCP-AP protocol layer (which, for example, on an LTE network, is an MPTCP-AP protocol layer similar to an S1-AP/X2-AP protocol layer) is newly defined on an application protocol layer above a transport layer; a new message, that is, an MPTCP HandOver Request message, is defined on the MPTCP-AP protocol layer; and the new message is used to carry the MPTCP context.

Optionally, when a manner in which an IE, that is, an MPTCP Context IE, is added to an existing 3GPP protocol message to carry the MPTCP context is used, a 3GPP message that carries the new IE is different in a different handover scenario.

For details about a 3GPP message that carries the new IE in a different handover scenario, refer to the description in the foregoing embodiment, and details are not described herein.

Step 502: Receive a response message sent by the MPTCP agent, to determine that the destination MPTCP agent has received the message that carries the MPTCP context of the UE and can perform an MPTCP data transmission operation or an MPTCP management and control operation for the UE according to the MPTCP context.

In the application scenario shown in FIG. 1, after locally saving context information of a source MPTCP connection, the destination MPTCP agent may establish an association relationship between the MPTCP connection between the destination MPTCP agent and the UE, and the TCP connection between the destination MPTCP agent and the server, to facilitate normal service data transmission subsequently. In the scenario in which both communication ends support the MPTCP protocol, after locally saving context information of a source MPTCP connection, the destination MPTCP agent may perform a management and control operation according to the saved MPTCP context.

After restoring an MPTCP agent scene, the destination MPTCP agent can send a response message to the source MPTCP agent, so that the source MPTCP agent determines that the destination MPTCP agent has received the message that carries the MPTCP context of the UE and can perform the MPTCP data transmission operation or the MPTCP management and control operation for the UE according to the MPTCP context.

Optionally, in the application scenario shown in FIG. 1, after receiving an MPTCP handover response message, if the source MPTCP agent discovers that unsent buffered data exists, the source MPTCP agent may forward the buffered data to the destination MPTCP agent. For downlink data, because of link interruption of an air interface, data needs to be forwarded to the destination MPTCP agent, and then be retransmitted to the UE by the destination MPTCP agent. For uplink data, service data may be sent by the source MPTCP agent to a network side; or may be forwarded by the source MPTCP agent to the destination MPTCP agent, and then be sent to a network side by the destination MPTCP agent.

Therefore, this embodiment of the present disclosure implements that when UE moves from a radio access device on which the source MPTCP is deployed to a radio access device on which the destination MPTCP agent is deployed, an MPTCP connection is maintained, which ensures that service continuity is not affected when the UE moves across MPTCP agents.

Figure 6:
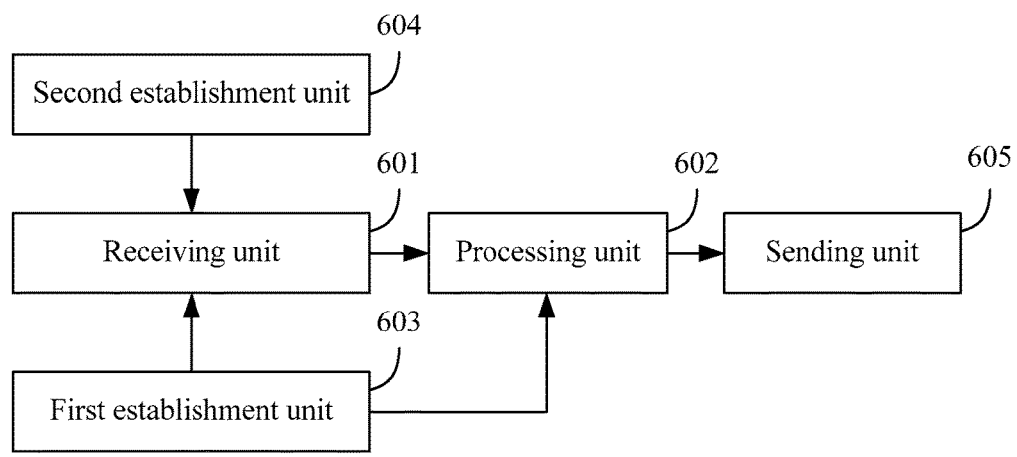
FIG. 6 is a schematic diagram of an apparatus for managing mobility of an MPTCP connection according to an embodiment of the present disclosure.

Correspondingly, the embodiments of the present disclosure further provide an apparatus for managing mobility of an MPTCP connection. FIG. 6 is a schematic diagram of an apparatus for managing mobility of an MPTCP connection according to an embodiment of the present disclosure. The apparatus provided in this embodiment is applied to a network system in which UE moves from a radio access device on which the source MPTCP agent is deployed to a radio access device on which the destination MPTCP agent is deployed. As shown in the figure, this embodiment includes the following units: a receiving unit 601 and a processing unit 602.

The receiving unit 601 is configured to receive a message that is sent by the source MPTCP agent and that carries an MPTCP context.

The receiving unit 601 is specifically configured to: receive, through an established signaling link, the message that carries the MPTCP context; or create a signaling link by using a local newly-defined MPTCP-AP protocol layer and an MPTCP-AP protocol layer of the source MPTCP agent, and receive, through the created signaling link, the message that carries the MPTCP context.

Specifically, the MPTCP context may be transmitted in the following manners: In one manner, an existing signaling link is used, where a transport layer is unchanged; and a newly defined 3GPP message, that is, an MPTCP HandOver Request message, is added to an application protocol layer to carry the MPTCP context, or an IE is added to an existing 3GPP protocol message to carry the MPTCP context. In another manner, a transport layer technology is utilized. For example, a TCP link is created; an MPTCP-AP protocol layer (which, for example, on an LTE network, is an MPTCP-AP protocol layer similar to an S1-AP/X2-AP protocol layer) is newly defined on an application protocol layer above a transport layer; a new message, that is, an MPTCP HandOver Request message, is defined on the MPTCP-AP protocol layer; and the new message is used to carry the MPTCP context.

For the scenario, shown in FIG. 1, in which only one communication end supports the MPTCP protocol, a saved MPTCP context includes MPTCP connection information, TCP connection information, and an association relationship between an MPTCP connection corresponding to the MPTCP connection information and a TCP connection corresponding to the TCP connection information. The MPTCP connection information includes but is not limited to any piece of or any combination of the following information: key Key information and token Token information of a local end of the MPTCP connection as well as key Key information and token Token information of a remote end of the MPTCP connection, available address information of two communication ends of the MPTCP connection, information about a service data transmit end of the MPTCP connection, information about a service data receive end of the MPTCP connection, information about whether a data sequence signaling DSS option needs to carry a checksum, information about multiple sub-flows included in the MPTCP connection, information about an algorithm related to the MPTCP connection, or a mapping relationship between a data sequence number DSN and a sub-flow sequence number SSN that are of the MPTCP connection. The TCP connection information includes but is not limited to any piece of or any combination of the following information: four-tuple information of the TCP connection, information about a service data transmit end of the TCP connection, or information about a service data receive end of the TCP connection.

For a scenario in which both communication ends support the MPTCP protocol, the MPTCP context includes MPTCP connection information, and management and control related information required for performing a management and control operation.

Specifically, the information about a service data transmit end of the MPTCP connection may include but is not limited to any piece of or any combination of the following information: a DSN corresponding to an unacknowledged data packet that is first sent, a DSN corresponding to a next to-be-sent data packet, a send window, a congestion window, a send buffer size, or the like. The information about a service data receive end of the MPTCP connection may include but is not limited to any piece of or any combination of the following information: a DSN corresponding to a next in-order data packet expected to be received, a receive window, a receive buffer size, or the like. The information about multiple sub-flows included in the MPTCP connection may include: a sub-flow backup flag bit in a downlink direction of and a sub-flow backup flag bit in an uplink direction of an air interface of a sub-flow; TCP four tuples of a sub-flow; information about a service data transmit end of a sub-flow, for example, an SSN corresponding to an unacknowledged data packet that is first sent, an SSN corresponding to a next to-be-sent data packet, and a congestion window; and information about a service data receive end of a sub-flow, for example, an SSN corresponding to a next in-order data packet expected to be received, and a receive window.

The information about a service data transmit end of the TCP connection may include but is not limited to any piece of or any combination of the following information: a sequence number corresponding to an unacknowledged data packet that is first sent, a sequence number corresponding to a next to-be-sent data packet, a send window, a congestion window, a send buffer size, or the like. The information about a service data receive end of the TCP connection may include but is not limited to any piece of or any combination of the following information: a sequence number corresponding to a next in-order data packet expected to be received, a receive window, a receive buffer size, or the like.

The processing unit 602 is configured to save the MPTCP context, and perform an MPTCP data transmission or management and control operation according to the saved MPTCP context.

In the application scenario shown in FIG. 1, after locally saving context information of a source MPTCP connection, the destination MPTCP agent may establish an association relationship between the MPTCP connection between the destination MPTCP agent and the UE, and the TCP connection between the destination MPTCP agent and the server, to facilitate normal service data transmission subsequently.

In the scenario in which both communication ends support the MPTCP protocol, after locally saving context information of a source MPTCP connection, the destination MPTCP agent may perform a management and control operation according to the saved MPTCP context.

Preferably, the apparatus provided in this embodiment of the present disclosure further includes a first establishment unit 603, configured to establish a transmission path to the source MPTCP agent, where the transmission path includes a signaling link for transmitting the MPTCP context and a user-plane tunnel for forwarding user service data.

Preferably, the apparatus provided in this embodiment of the present disclosure further includes a second establishment unit 604, configured to establish a transmission path to the source MPTCP agent, where the transmission path includes a signaling link for transmitting the MPTCP context.

Preferably, the apparatus provided in this embodiment of the present disclosure further includes a sending unit 605, configured to send a response message to the source MPTCP agent.

The apparatus provided in this embodiment of the present disclosure receives a message that is sent by the source MPTCP agent and that carries an MPTCP context; and saves the MPTCP context, and performs an MPTCP data transmission or management and control operation according to the saved MPTCP context. This implements that, in a scenario in which both a source MPTCP agent and a destination MPTCP agent are deployed at a RAN side, in the scenario shown in FIG. 1, when UE moves from a radio access device on which the source MPTCP agent is deployed to a radio access device on which the destination MPTCP agent is deployed, an MPTCP connection is maintained, which ensures that service continuity is not affected when the UE moves across MPTCP agents, or ensures that the destination MPTCP agent can continue to perform a management and control operation when both communication ends support MPTCP.

Figure 7:
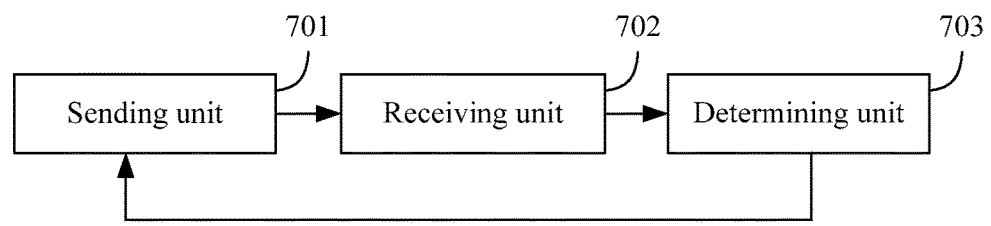
FIG. 7 is a schematic diagram of another apparatus for managing mobility of an MPTCP connection according to an embodiment of the present disclosure.

FIG. 7 is a schematic diagram of another apparatus for managing mobility of an MPTCP connection according to an embodiment of the present disclosure. The apparatus provided in this embodiment is applied to a network system in which UE moves from a radio access device on which the source MPTCP agent is deployed to a radio access device on which the destination MPTCP agent is deployed. As shown in the figure, this embodiment includes the following units: a sending unit 701, a receiving unit 702, and a determining unit 703.

The sending unit 701 is configured to send the destination MPTCP agent a message that carries an MPTCP context of the UE.

To implement the technical solution provided in this embodiment of the present disclosure, a transmission path needs to exist between all MPTCP agents having a neighboring relationship, where the transmission path includes a signaling link for exchanging an MPTCP context.

When being activated, the source MPTCP agent may initiate a signaling link establishment request to a neighboring destination MPTCP agent, to establish a signaling link between the source MPTCP agent and the destination MPTCP agent.

For the application scenario shown in FIG. 1, one side of the UE and the server does not support the MPTCP protocol. In the following example used to describe the technical solution in this embodiment of the present disclosure, the UE supports the MPTCP protocol but the server does not support the MPTCP protocol. Certainly, the technical solution is also applicable to a case in which the server supports the MPTCP protocol but the UE does not support the MPTCP protocol, and a case in which both the server and the UE support the MPTCP protocol.

For the scenario, shown in FIG. 1, in which only one communication end supports the MPTCP protocol, a saved MPTCP context includes MPTCP connection information, TCP connection information, and an association relationship between an MPTCP connection corresponding to the MPTCP connection information and a TCP connection corresponding to the TCP connection information. The MPTCP connection information includes but is not limited to any piece of or any combination of the following information: key Key information and token Token information of a local end of the MPTCP connection as well as key Key information and token Token information of a remote end of the MPTCP connection, available address information of two communication ends of the MPTCP connection, information about a service data transmit end of the MPTCP connection, information about a service data receive end of the MPTCP connection, information about whether a data sequence signaling DSS option needs to carry a checksum, information about multiple sub-flows included in the MPTCP connection, information about an algorithm related to the MPTCP connection, or a mapping relationship between a data sequence number DSN and a sub-flow sequence number SSN that are of the MPTCP connection. The TCP connection information includes but is not limited to any piece of or any combination of the following information: four-tuple information of the TCP connection, information about a service data transmit end of the TCP connection, or information about a service data receive end of the TCP connection.

For a scenario in which both communication ends support the MPTCP protocol, the MPTCP context includes related information about an MPTCP connection between the two communication ends, and management and control related information required for performing a management and control operation.

Specifically, the information about a service data transmit end of the MPTCP connection may include but is not limited to any piece of or any combination of the following information: a DSN corresponding to an unacknowledged data packet that is first sent, a DSN corresponding to a next to-be-sent data packet, a send window, a congestion window, a send buffer size, or the like. The information about a service data receive end of the MPTCP connection may include a DSN corresponding to a next in-order data packet expected to be received, a receive window, a receive buffer size, and the like. The information about multiple sub-flows included in the MPTCP connection may include but is not limited to any piece of or any combination of the following information: a sub-flow backup flag bit in a downlink direction of and a sub-flow backup flag bit in an uplink direction of an air interface of a sub-flow; TCP four tuples of a sub-flow; information about a service data transmit end of a sub-flow, for example, an SSN corresponding to an unacknowledged data packet that is first sent, an SSN corresponding to a next to-be-sent data packet, and a congestion window; or information about a service data receive end of a sub-flow, for example, an SSN corresponding to a next in-order data packet expected to be received, and a receive window.

It should be noted that the mentioned sub-flow backup flag bit in a downlink direction of an air interface of a sub-flow in this application file refers to a flag bit indicating whether a data transmit end of the sub-flow uses the TCP sub-flow as a backup when sending data to a data receive end during downlink data transmission; the sub-flow backup flag bit in an uplink direction of an air interface of a sub-flow refers to a flag bit indicating whether a data transmit end of the sub-flow uses the TCP sub-flow as a backup when sending data to a data receive end during uplink data transmission.

The information about a service data transmit end of the TCP connection may include but is not limited to any piece of or any combination of the following information: a sequence number corresponding to an unacknowledged data packet that is first sent, a sequence number corresponding to a next to-be-sent data packet, a send window, a congestion window, a send buffer size, or the like. The information about a service data receive end of the TCP connection may include but is not limited to any piece of or any combination of the following information: a sequence number corresponding to a next in-order data packet expected to be received, a receive window, a receive buffer size, or the like.

The MPTCP context may be transmitted in the following manners: In one manner, an existing signaling link is used, for example, an S1 signaling link or an X2 signaling connection on an LTE network, where a transport layer is unchanged; and a newly defined 3GPP message, that is, an MPTCP HandOver Request message, is added to an application protocol layer to carry the MPTCP context, or an IE is added to an existing 3GPP protocol message to carry the MPTCP context. In another manner, a transport layer technology is utilized. For example, a TCP link is created; an MPTCP-AP protocol layer (which, for example, on an LTE network, is an MPTCP-AP protocol layer similar to an S1-AP/X2-AP protocol layer) is newly defined on an application protocol layer above a transport layer; a new message, that is, an MPTCP HandOver Request message, is defined on the MPTCP-AP protocol layer; and the new message is used to carry the MPTCP context.

Optionally, when a manner in which an IE, that is, an MPTCP Context IE, is added to an existing 3GPP protocol message to carry the MPTCP context is used, a 3GPP message that carries the new IE is different in a different handover scenario.

For details about a 3GPP message that carries the new IE in a different handover scenario, refer to the description in the foregoing embodiment, and details are not described herein.

The receiving unit 702 is configured to receive a response message sent by the MPTCP agent.

In the application scenario shown in FIG. 1, after locally saving context information of a source MPTCP connection, the destination MPTCP agent may establish an association relationship between the MPTCP connection between the destination MPTCP agent and the UE, and the TCP connection between the destination MPTCP agent and the server, to facilitate normal service data transmission subsequently. In the scenario in which both communication ends support the MPTCP protocol, after locally saving context information of a source MPTCP connection, the destination MPTCP agent may perform a management and control operation according to the saved MPTCP context.

After restoring an MPTCP agent scene, the destination MPTCP agent can send a response message to the source MPTCP agent, so that the source MPTCP agent determines that the destination MPTCP agent has received the message that carries the MPTCP context of the UE and can perform an MPTCP data transmission operation or an MPTCP management and control operation for the UE according to the MPTCP context.

The determining unit 703 is configured to determine that the destination MPTCP agent has received the message that carries the MPTCP context of the UE and can perform an MPTCP data transmission operation or an MPTCP management and control operation for the UE according to the MPTCP context.

The sending unit 701 is further configured to forward locally stored user service data of the UE to the destination MPTCP agent.

Optionally, in the application scenario shown in FIG. 1, after receiving an MPTCP handover response message, if the source MPTCP agent discovers that unsent buffered data exists, the source MPTCP agent may forward the buffered data to the destination MPTCP agent. For downlink data, because of link interruption of an air interface, data needs to be forwarded to the destination MPTCP agent, and then be retransmitted to the UE by the destination MPTCP agent. For uplink data, service data may be sent by the source MPTCP agent to a network side; or may be forwarded by the source MPTCP agent to the destination MPTCP agent, and then be sent to a network side by the destination MPTCP agent.

Therefore, this embodiment of the present disclosure implements that when UE moves from a radio access device on which the source MPTCP is deployed to a radio access device on which the destination MPTCP agent is deployed, an MPTCP connection is maintained, which ensures that service continuity is not affected when the UE moves across MPTCP agents.

Figure 8:
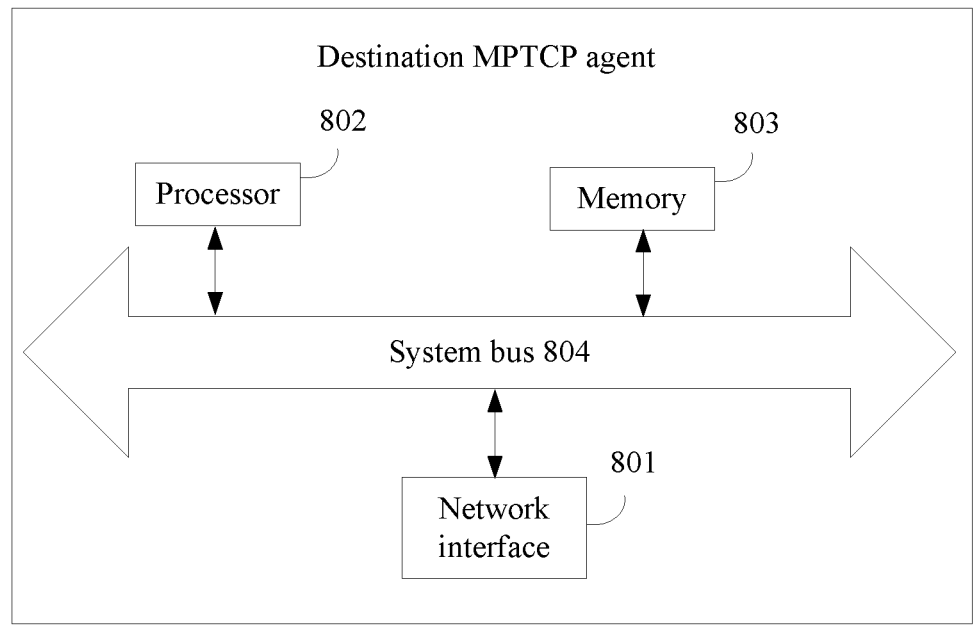
FIG. 8 is a schematic diagram of a destination MPTCP agent according to an embodiment of the present disclosure.

FIG. 8 is a schematic diagram of a destination MPTCP agent according to an embodiment of the present disclosure. As shown in the figure, the destination MPTCP agent includes a network interface 801, a processor 802, and a memory 803. A system bus 804 is configured to connect the network interface 801, the processor 802, and the memory 803, and is configured to bear data transmission between the components.

The network interface 801 is configured to communicate with another network entity.

The memory 803 has a software program and a device driver. The processor 802 may load a software module in the memory 803 and enable, according to the software module, each component to execute a corresponding function. The device driver may be an interface driver.

In the destination MPTCP agent provided in this embodiment of the present disclosure, the processor 802 loads the software module in the memory 803 and executes the following instruction according to the software module:

receiving a message that is sent by the source MPTCP agent and that carries an MPTCP context; and saving the MPTCP context, and performing an MPTCP data transmission or management and control operation according to the saved MPTCP context.

In the performing, by the processor 802 and the destination MPTCP agent, an MPTCP data transmission operation according to the saved MPTCP context, the saved MPTCP context includes MPTCP connection information, TCP connection information, and an association relationship between an MPTCP connection corresponding to the MPTCP connection information and a TCP connection corresponding to the TCP connection information, where the MPTCP connection information is related information about an MPTCP connection between the source MPTCP agent and one end of two communication ends, and the TCP connection information is related information about a TCP connection between the source MPTCP agent and the other end of the two communication ends.

In the performing, by the processor 802 and the destination MPTCP agent, a management and control operation according to the saved MPTCP context, the saved MPTCP context includes MPTCP connection information, and management and control related information required for performing the management and control operation.

Further, for the application scenario shown in FIG. 1, the software module further includes an instruction that can be used to enable the processor and the destination MPTCP agent to execute the following process: establishing a transmission path to the source MPTCP agent, where the transmission path includes a signaling link for transmitting the MPTCP context and a user-plane tunnel for forwarding user service data.

Further, for an application scenario in which both communication ends support MPTCP, the software module further includes an instruction that can be used to enable the processor and the destination MPTCP agent to execute the following process: establishing a transmission path to the source MPTCP agent, where the transmission path includes a signaling link for transmitting the MPTCP context.

Further, the software module further includes an instruction that can be used to enable the processor and the destination MPTCP agent to execute the following process: sending a response message to the source MPTCP agent.

The MPTCP connection information includes but is not limited to any piece of or any combination of the following information: key Key information and token Token information of a local end of the MPTCP connection as well as key Key information and token Token information of a remote end of the MPTCP connection, available address information of two communication ends of the MPTCP connection, information about a service data transmit end of the MPTCP connection, information about a service data receive end of the MPTCP connection, information about whether a data sequence signaling DSS option needs to carry a checksum, information about multiple sub-flows included in the MPTCP connection, information about an algorithm related to the MPTCP connection, or a mapping relationship between a data sequence number DSN and a sub-flow sequence number SSN that are of the MPTCP connection. The TCP connection information includes but is not limited to any piece of or any combination of the following information: four-tuple information of the TCP connection, information about a service data transmit end of the TCP connection, or information about a service data receive end of the TCP connection.

Further, the instruction for the processor and the destination MPTCP agent to execute the process of receiving a message that is sent by the source MPTCP agent and that carries an MPTCP context is specifically: receiving, through the established signaling link, the message that carries the MPTCP context; or creating a signaling link by using a local newly-defined MPTCP-AP protocol layer and an MPTCP-AP protocol layer of the source MPTCP agent, and receiving, through the created signaling link, the message that carries the MPTCP context.

This embodiment of the present disclosure implements that, in a scenario in which both a source MPTCP agent and a destination MPTCP agent are deployed at a RAN side, in the scenario shown in FIG. 1, when UE moves from a radio access device on which the source MPTCP agent is deployed to a radio access device on which the destination MPTCP agent is deployed, an MPTCP connection is maintained, which ensures that service continuity is not affected when the UE moves across MPTCP agents, or ensures that the destination MPTCP agent can continue to perform a management and control operation when both communication ends support MPTCP.

Figure 9:
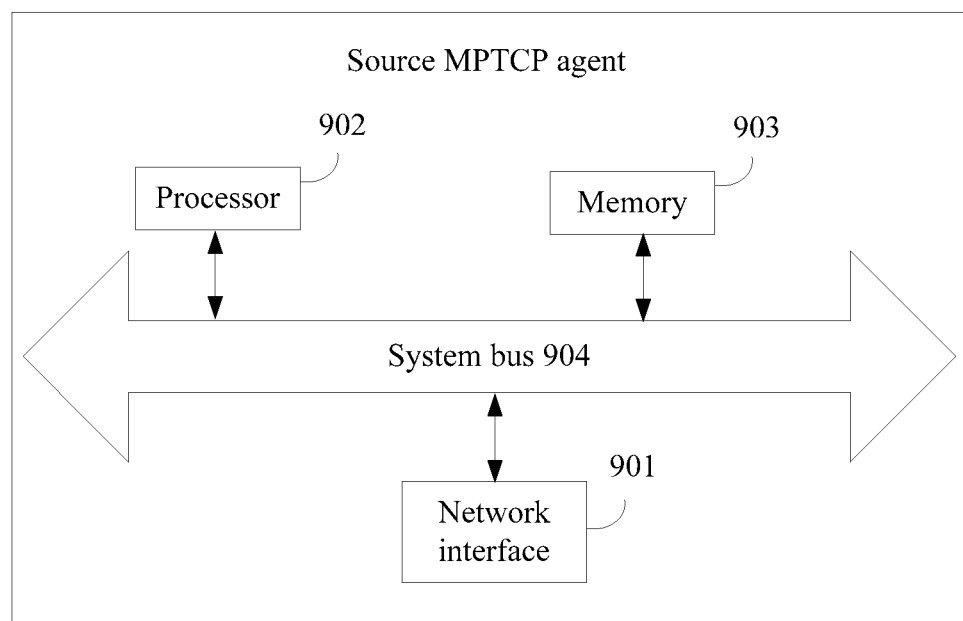
FIG. 9 is a schematic diagram of a source MPTCP agent according to an embodiment of the present disclosure.

FIG. 9 is a schematic diagram of a source MPTCP agent according to an embodiment of the present disclosure. As shown in the figure, the source MPTCP agent includes a network interface 901, a processor 902, and a memory 903. A system bus 904 is configured to connect the network interface 901, the processor 902, and the memory 903, and is configured to bear data transmission between the components.

The network interface 901 is configured to communicate with another network entity.

The memory 903 has a software program and a device driver. The processor 902 may load a software module in the memory 903 and enable, according to the software module, each component to execute a corresponding function. The device driver may be an interface driver.

In the source MPTCP agent provided in this embodiment of the present disclosure, the processor 902 loads the software module in the memory 903 and executes the following instruction according to the software module:

sending a destination MPTCP agent a message that carries an MPTCP context of the UE; and receiving a response message sent by the MPTCP agent, to determine that the destination MPTCP agent has received the message that carries the MPTCP context of the UE and can perform an MPTCP data transmission operation or an MPTCP management and control operation for the UE according to the MPTCP context.

MPTCP connection information includes but is not limited to any piece of or any combination of the following information: key Key information and token Token information of a local end of the MPTCP connection as well as key Key information and token Token information of a remote end of the MPTCP connection, available address information of two communication ends of the MPTCP connection, information about a service data transmit end of the MPTCP connection, information about a service data receive end of the MPTCP connection, information about whether a data sequence signaling DSS option needs to carry a checksum, information about multiple sub-flows included in the MPTCP connection, information about an algorithm related to the MPTCP connection, or a mapping relationship between a data sequence number DSN and a sub-flow sequence number SSN that are of the MPTCP connection. The TCP connection information includes but is not limited to any piece of or any combination of the following information: four-tuple information of the TCP connection, information about a service data transmit end of the TCP connection, or information about a service data receive end of the TCP connection.

In the performing, by the processor 902 and the source MPTCP agent, an MPTCP data transmission operation for the UE according to the MPTCP context, the MPTCP context includes MPTCP connection information, TCP connection information, and an association relationship between an MPTCP connection corresponding to the MPTCP connection information and a TCP connection corresponding to the TCP connection information, where the MPTCP connection information is related information about an MPTCP connection between the source MPTCP agent and one end of two communication ends, and the TCP connection information is related information about a TCP connection between the source MPTCP agent and the other end of the two communication ends.

In the performing, by the processor 902 and the source MPTCP agent, a management and control operation for the UE according to the MPTCP context, the MPTCP context includes related information about an MPTCP connection between two communication ends and management and control related information required for performing the management and control operation.

Further, the software module further includes an instruction that can be used to enable the processor 902 and the source MPTCP agent to execute the following process: forwarding locally stored user service data of the UE to the destination MPTCP agent.

Further, the instruction for the processor 902 and the source MPTCP agent to execute the process of sending the destination MPTCP agent an MPTCP context that carries the UE is specifically: sending, through an established signaling link, the message that carries the MPTCP context; or creating a signaling link by using a local newly-defined MPTCP-AP protocol layer and an MPTCP-AP protocol layer of the destination MPTCP agent, and sending, through the created signaling link, the message that carries the MPTCP context.

Therefore, this embodiment of the present disclosure implements that when UE moves from a radio access device on which the source MPTCP is deployed to a radio access device on which the destination MPTCP agent is deployed, an MPTCP connection is maintained, which ensures that service continuity is not affected when the UE moves across MPTCP agents.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

Steps of methods or algorithms described in the embodiments disclosed in this specification may be implemented by hardware, a software module executed by a processor, or a combination thereof. The software module may be configured in a random access memory (RAM), a memory, a read-only memory (ROM), an electrically programmable ROM, an electrically erasable programmable ROM, a register, a hard disk, a removable disk, a CD-ROM, or a storage medium in any other forms well-known in the art.

In the foregoing specific implementation manners, the objective, technical solutions, and benefits of the present disclosure are further described in detail. It should be understood that the foregoing descriptions are merely specific implementation manners of the present disclosure, but are not intended to limit the protection scope of the present disclosure. Any modification, equivalent replacement, or improvement made without departing from the spirit and principle of the present disclosure should fall within the protection scope of the present disclosure.

What is claimed is:

1. A method for managing mobility of a Multipath Transmission Control Protocol (MPTCP) connection of a user equipment (UE) moving from a radio access device on which a source MPTCP agent is deployed to a radio access device on which a destination MPTCP agent is deployed, the method comprising:

receiving, by the destination MPTCP agent, a message that is sent by the source MPTCP agent and that carries an MPTCP context of the UE, wherein the receiving, by the destination MPTCP agent, the message that is sent by the source MPTCP agent and that carries the MPTCP context of the UE comprises: receiving, by the destination MPTCP agent, through an established signaling link, an MPTCP Handover Request message defined by an MPTCP application protocol (MPTCP-AP) layer above a transport layer of the established signaling link by using a local MPTCP-AP protocol layer and an MPTCP-AP protocol layer of the source MPTCP agent, wherein the MPTCP Handover Request message carries the MPTCP context;

saving, by the destination MPTCP agent, the MPTCP context; and performing, by the destination MPTCP agent, an MPTCP data transmission operation or an MPTCP management and control operation for the UE according to the saved MPTCP context.

2. The method for managing mobility of the MPTCP connection according to claim 1, wherein the saved MPTCP context comprises MPTCP connection information, transmission control protocol (TCP) connection information, and an association relationship between an MPTCP connection corresponding to the MPTCP connection information and a TCP connection corresponding to the TCP connection information, wherein the MPTCP connection information is related information about an MPTCP connection between the source MPTCP agent and one end of two communication ends, and the TCP connection information is related information about a TCP connection between the source MPTCP agent and the other end of the two communication ends.

3. The method for managing mobility of the MPTCP connection according to claim 2, before the receiving, by the destination MPTCP agent, the message that is sent by the source MPTCP agent and that carries the MPTCP context of the UE, the method further comprises:

establishing, by the destination MPTCP agent, a transmission path to the source MPTCP agent, wherein the transmission path comprises the signaling link for transmitting the MPTCP context and a user-plane tunnel for forwarding user service data.

4. The method for managing mobility of the MPTCP connection according to claim 2, wherein the MPTCP connection information comprises any piece of or any combination of the following information: key information and token information of a local end of the MPTCP connection as well as key information and token information of a remote end of the MPTCP connection, available address information of the two communication ends of the MPTCP connection, information about a service data transmit end of the MPTCP connection, information about a service data receive end of the MPTCP connection, information about whether a data sequence signaling (DSS) option needs to carry a checksum, information about multiple sub-flows comprised in the MPTCP connection, information about an algorithm related to the MPTCP connection, or a mapping relationship between a data sequence number (DSN) and a sub-flow sequence number (SSN) that are of the MPTCP connection; and the TCP connection information comprises but is not limited to any piece of or any combination of the following information: four-tuple information of the TCP connection, information about a service data transmit end of the TCP connection, or information about a service data receive end of the TCP connection.

5. The method for managing mobility of an MPTCP connection according to claim 1, wherein the saved MPTCP context comprises related information about an MPTCP connection between two communication ends, and management and control related information required for performing the management and control operation.

6. The method for managing mobility of the MPTCP connection according to claim 5, before the receiving, by the destination MPTCP agent, the message that is sent by the source MPTCP agent and that carries the MPTCP context of the UE, the method further comprises:

establishing, by the destination MPTCP agent, a transmission path to the source MPTCP agent, wherein the transmission path comprises the signaling link for transmitting the MPTCP context.

7. A destination Multipath Transmission Control Protocol (MPTCP) agent for managing mobility of a MPCTP connection of a user equipment (UE) moving from a radio access device on which a source MPTCP agent is deployed to a radio access device on which the destination MPTCP agent is deployed, the destination MPTCP agent comprising:
a network interface;
a memory storing instructions;
a processor configured to execute the instructions to cause the destination MPTCP agent to perform the following process:
receiving a message that is sent by the source MPTCP agent and that carries an MPTCP context of the UE, wherein receiving the message that is sent by the source MPTCP agent and that carries the MPTCP context of the UE comprises: receiving through an established signaling link, an MPTCP Handover Request message defined by an MPTCP application protocol (MPTCP-AP) layer above a transport layer of the established signaling link by using a local MPTCP-AP protocol layer and an MPTCP-AP protocol layer of the source MPTCP agent, wherein the MPTCP Handover Request message carries the MPTCP context;
saving the MPTCP context; and
performing an MPTCP data transmission operation or an MPTCP management and control operation for the UE according to the saved MPTCP context.

8. The destination MPTCP agent according to claim 7, wherein the saved MPTCP context comprises MPTCP connection information, transmission control protocol (TCP) connection information, and an association relationship between an MPTCP connection corresponding to the MPTCP connection information and a TCP connection corresponding to the TCP connection information, wherein the MPTCP connection information is related information about an MPTCP connection between the source MPTCP agent and one end of two communication ends, and the TCP connection information is related information about a TCP connection between the source MPTCP agent and the other end of the two communication ends.

9. The destination MPTCP agent according to claim 8, wherein the instructions, when executed by the processor, further cause the destination MPTCP agent to perform the following process: establishing a transmission path to the source MPTCP agent, wherein the transmission path comprises the signaling link for transmitting the MPTCP context and a user-plane tunnel for forwarding user service data.

10. The destination MPTCP agent according to claim 8, wherein the MPTCP connection information comprises any piece of or any combination of the following information: key information and token information of a local end of the MPTCP connection as well as key information and token information of a remote end of the MPTCP connection, available address information of the two communication ends of the MPTCP connection, information about a service data transmit end of the MPTCP connection, information about a service data receive end of the MPTCP connection, information about whether a data sequence signaling (DSS) option needs to carry a checksum, information about multiple sub-flows comprised in the MPTCP connection, information about an algorithm related to the MPTCP connection, or a mapping relationship between a data sequence number (DSN) and a sub-flow sequence number (SSN) that are of the MPTCP connection; and the TCP connection information comprises but is not limited to any piece of or any combination of the following information: four-tuple information of the TCP connection, information about a service data transmit end of the TCP connection, or information about a service data receive end of the TCP connection.

11. The destination MPTCP agent according to claim 7, wherein the saved MPTCP context comprises MPTCP connection information, and management and control related information required for performing the management and control operation.

12. The destination MPTCP agent according to claim 11, wherein the instructions, when executed by the processor, further cause the destination MPTCP agent to perform the following process: establishing a transmission path to the source MPTCP agent, wherein the transmission path comprises the signaling link for transmitting the MPTCP context.

13. A source Multipath Transmission Control Protocol (MPTCP) agent for managing mobility of a MPCTP connection of a user equipment (UE) moving from a radio access device on which the source MPTCP agent is deployed to a radio access device on which a destination MPTCP agent is deployed, the source MPTCP agent comprising:
a network interface;
a memory storing instruction;
a processor configured to execute the instructions to cause the source MPTCP agent to perform the following process:

sending the destination MPTCP agent a message that carries an MPTCP context of the UE, wherein the sending the destination MPTCP agent the message that carries the MPTCP context of the UE comprises:

sending through an established signaling link, a MPTCP Handover Request message defined by an MPTCP application protocol (MPTCP-AP) layer above a transport layer of the established signaling link by using a local MPTCP-AP protocol layer and an MPTCP-AP protocol layer of the destination MPTCP agent, wherein the MPTCP Handover Request message carries the MPTCP context; and receiving a response message sent by the destination MPTCP agent, to determine that the destination MPTCP agent has received the message that carries the MPTCP context of the UE and can perform an MPTCP data transmission operation or an MPTCP management and control operation for the UE according to the MPTCP context.

14. The source MPTCP agent according to claim 13, wherein the MPTCP context comprises MPTCP connection information, transmission control protocol (TCP) connection information, and an association relationship between an MPTCP connection corresponding to the MPTCP connection information and a TCP connection corresponding to the TCP connection information, wherein the MPTCP connection information is related information about an MPTCP connection between the source MPTCP agent and one end of two communication ends, and the TCP connection information is related information about a TCP connection between the source MPTCP agent and the other end of the two communication ends.

15. The source MPTCP agent according to claim 14, wherein the instructions, when executed by the processor, further cause the source MPTCP agent to perform the following process: forwarding locally stored user service data of the UE to the destination MPTCP agent.

16. The source MPTCP agent according to claim 14, wherein the MPTCP connection information comprises any piece of or any combination of the following information: key information and token information of a local end of the MPTCP connection as well as key information and token information of a remote end of the MPTCP connection, available address information of the two communication ends of the MPTCP connection, information about a service data transmit end of the MPTCP connection, information about a service data receive end of the MPTCP connection, information about whether a data sequence signaling (DSS) option needs to carry a checksum, information about multiple sub-flows comprised in the MPTCP connection, information about an algorithm related to the MPTCP connection, or a mapping relationship between a data sequence number (DSN) and a sub-flow sequence number (SSN) that are of the MPTCP connection; and the TCP connection information comprises but is not limited to any piece of or any combination of the following information: four-tuple information of the TCP connection, information about a service data transmit end of the TCP connection, or information about a service data receive end of the TCP connection.

17. The source MPTCP agent according to claim 13, wherein the MPTCP context comprises related information about an MPTCP connection between two communication ends, and management and control related information required for performing the management and control operation.

* * * * *